C. SETZLER.
AUTOMOBILE FENDER.
APPLICATION FILED MAR. 25, 1912.
1,102,446.
Patented July 7, 1914.
2 SHEETS—SHEET 2.
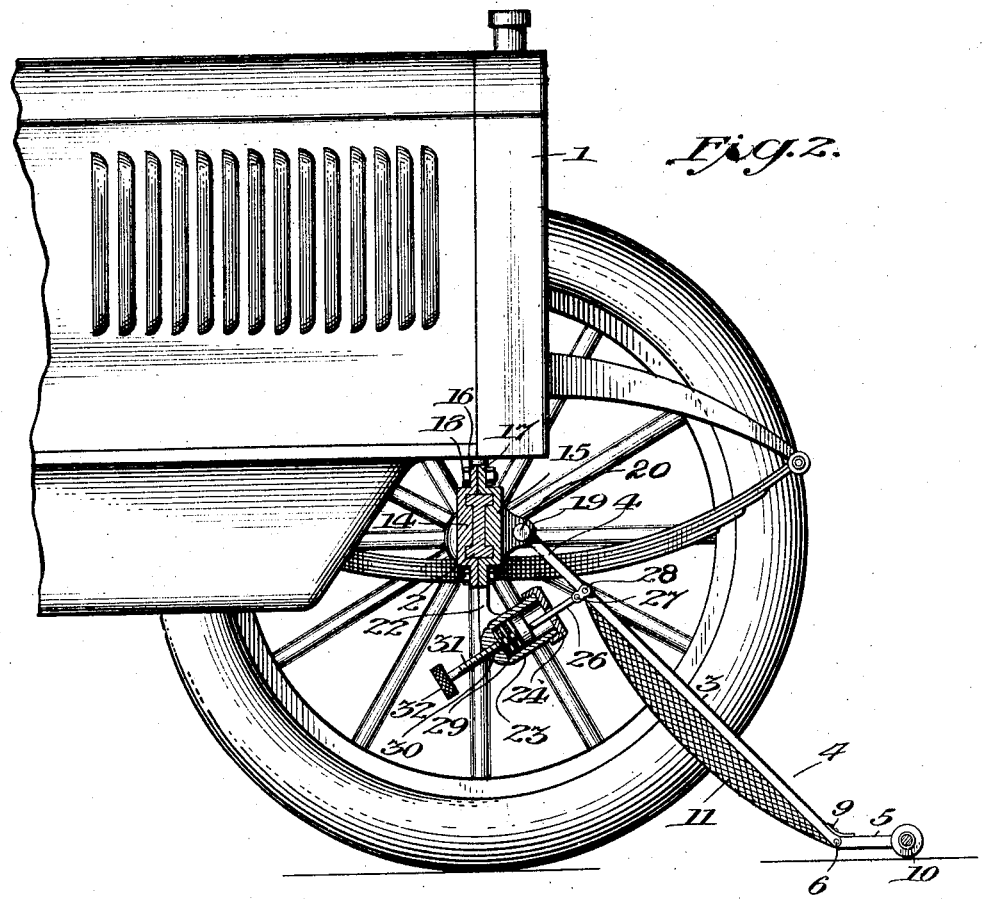
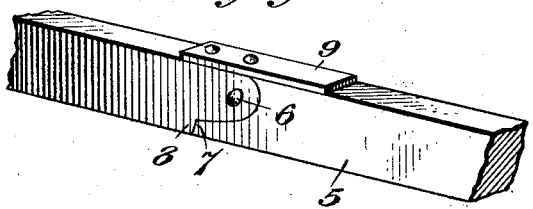

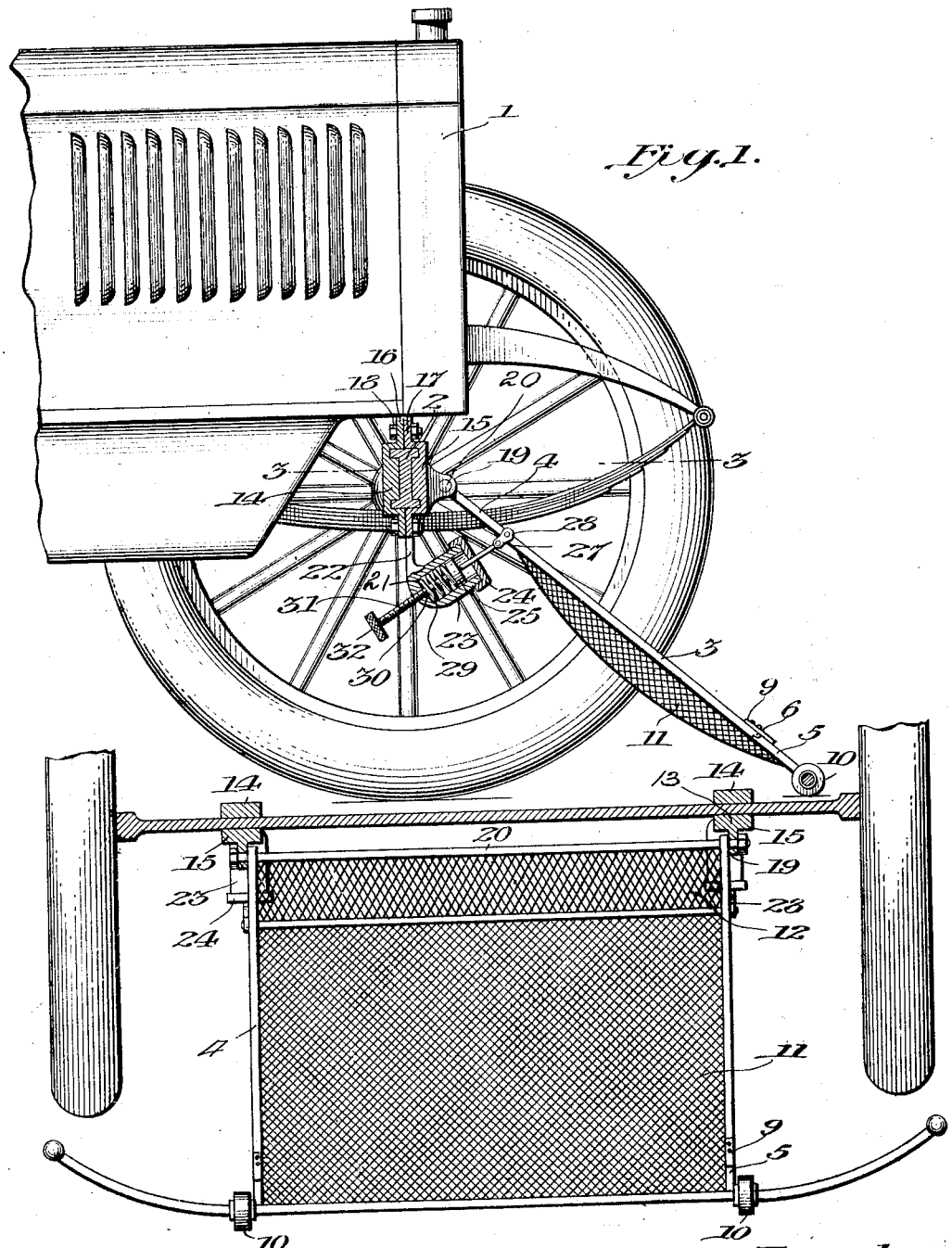

UNITED STATES PATENT OFFICE.

CHARLES SETZLER, OF BOONEVILLE, ARKANSAS.

AUTOMOBILE-FENDER.

1,102,446.
Specification of Letters Patent.
Patented July 7, 1914.

Application filed March 25, 1912. Serial No. 686,152.

*To all whom it may concern:*

Be it known that I, CHARLES SETZLER, a citizen of the United States, residing at Booneville, in the county of Logan and State of Arkansas, have invented new and useful Improvements in Automobile-Fenders, of which the following is a specification.

This invention relates to automobile fenders, and has for an object to provide a fender that can be readily attached to and positioned on an automobile so that should a person be run down and struck by the machine he will be carefully picked up by the fender and thereby guarded against injury by being run over by the car.

Another object of the invention is to provide means for yieldingly supporting the fender to operative collecting position, the said means serving as a buffer to cushion the shock, incident to the contact of the fender with the person or object struck thereby.

Another object of the invention is to provide the fender with attaching means which will permit the same to be readily attached to the front axle of an automobile without requiring any changes in the construction of the same.

Another object of the invention is to provide means for adjusting the fender to operative or inoperative position.

In the drawings, forming a portion of this specification and in which like numerals of reference indicate similar parts in the several views:—Figure 1 is a side view of an automobile showing the application of the fender thereto, parts being shown in section. Fig. 2 is a similar view showing the fender in the position which it assumes after the object has been collected thereby. Fig. 3 is a horizontal section on line 3—3 of Fig. 1, and Fig. 4 is a perspective view of a portion of the fender.

The automobile 1 conventionally shown herein is provided with a front axle 2 which is substantially of I-configuration in transverse section.

The fender 3 comprises a basket frame which includes the upper section 4 and the lower section 5. The side bars of the lower section are pivotally connected, at 6, to the side bars of the upper section. The side bars of the said upper section are provided at points adjacent to the inner extremities of the side bars of the lower section 5 with shoulders 7 against which similar shoulders 8 on the side bars of the section 5 are adapted to engage. Springs 9 on the upper section 4 have their free ends engaged against the section 5 to hold the shoulders 7 and 8 in normal contact with each other and for maintaining the upper and lower sections 4 and 5 in the same general plane with each other when the fender is in the position shown in Fig. 1. The lower section 5 is provided with suitable supporting wheels 10 which are adapted to travel on the ground. By yieldingly connecting the lower section 5 with the upper section 4 the fender will be permitted to pass over imperfections in the road or rocks or the like without being injured thereby.

The basket-portion of the fender which is secured to the frame is in the form of a suitable foraminous bottom which preferably includes the flexible lower part 11 and the rigid upper part 12. Attaching brackets 13 are employed for the purpose of connecting the fender with the front axle 2. These brackets each include companion sections 14 and 15 which are arranged in embracing relation upon the axle 2. The section 14 is provided with ears 16 which extend against similar ears 17 upon the section 15. Clamping bolts or like fastenings 18 extend through the ears for the purpose of holding the brackets operatively secured upon the axle. The sections 15 of the brackets are provided with ears 19 in which the top bar 20 of the section 4 of the basket frame is pivotally mounted.

Means 21 are employed for maintaining the fender in normal collecting position, as shown in Fig. 1. This means comprises one or more arms 22 on the sections 15 of the brackets and cylinders 23. The cylinders are carried by the arms and the outer ends of the cylinders are closed by caps 24. Plungers 25 are adapted to reciprocate in the cylinders, and as illustrated, the rods 26 of the plungers are pivotally connected, at 27, to the brackets 28 on the section 4 of the fender frame. Cushioning or buffer springs 29 are located in the cylinders 23 and they are engaged against the plungers 25 so as to hold them normally in their outermost positions. Besides serving as means for maintaining the fender in normal collecting position, the means 21 form cushioning elements to absorb the shock and the sudden impact of the fender against the person struck and the jar, incident to the contact of the fender with the person, will be reduced to a minimum.

In traveling over country roads or other similar rough surfaces it is desirable to adjust the fender to a partly inoperative position. In other words, it is found well to so adjust the fender that the wheels 10 thereof will be out of contact with the ground surface. Considering the above I provide the cylinders 23 with threaded passages 30 and in each passage is mounted a screw 31. One end of the screw may be engaged against the plunger 25 of the casing and the other end of the screw carries a knurled manipulating portion 32. From this construction it is seen that the screw can be adjusted so as to engage against the plunger and move the same longitudinally in one direction in the cylinder to thereby elevate the fender to a partly inoperative position.

It is of course understood that when the fender shown in Figs. 1 to 4, inclusive, is in use the screws 31 are adjusted so as to permit the retarding plungers 25 to operatively move, as described.

I claim:

1. A fender including a frame comprising an upper and a lower section, means for pivotally connecting the side bars of said sections, shoulders formed on the inner extremities of the side bars of the lower section, a second set of shoulders formed on the ends of the bars of the upper section and adapted to normally abut against the first shoulders, and springs carried by the side bars of the upper section and having their free ends engaging the side bars of the lower section to resiliently retain the lower section in its normal position.

2. A fender including a frame comprising an upper and lower section, means for pivotally connecting the side bars of said sections, shoulders formed on the inner extremities of the side bars of the lower section, a second set of shoulders formed on the ends of the side bars of the upper section and adapted to normally abut against the first shoulders, and means for resiliently retaining said shoulders in their normal position.

3. A device of the class described including attaching brackets, a frame pivotally connected to said brackets, arms carried by the brackets, cylinders supported by said arms, reciprocating plungers within said cylinders and rods pivotally connecting said plungers to the frame, as and for the purpose set forth.

4. A device of the class described including attaching brackets, a frame pivotally connected to said brackets, arms carried by the brackets, cylinders supported by said arms, reciprocating plungers within said cylinders, rods pivotally connecting said plungers to the frame, coil springs in the cylinders and bearing against the plungers, and adjusting screws connected to the plungers to move the same against the tension of the springs.

5. A fender for automobiles comprising brackets adapted to engage the front axle of an automobile, cylinders carried by the brackets, yieldable means in the cylinders, a basket frame pivotally mounted in the brackets, and means mounted for reciprocatory movements in the cylinders and bearing against the said yieldable means and pivotally connected with the said basket frame.

In testimony whereof I affix my signature in presence of two witnesses.

CHARLES SETZLER.

Witnesses:
H. HESS,
FRED D. MCCORMACK.

Copies of this patent may be obtained for five cents each, by addressing the "Commissioner of Patents, Washington, D. C."